Dec. 24, 1935.   J. L. CREVELING   2,025,227
LUBRICATING DEVICE
Original Filed Sept. 17, 1931

INVENTOR.
JOHN L. CREVELING
BY
ATTORNEY.

Patented Dec. 24, 1935

2,025,227

UNITED STATES PATENT OFFICE 2,025,227

LUBRICATING DEVICE

John L. Creveling, near Tucson, Ariz., assignor to The Lubrication Corporation, a corporation of Delaware Original application September 17, 1931, Serial No. 563,407, now Patent No. 2,010,140, August 6, 1935. Divided and this application December 24, 1934, Serial No. 759,019

4 Claims. (Cl. 285—143)

This invention relates to lubricating devices and more particularly to devices for coupling a source of grease, or other lubricant supply to a fitting or nipple to be lubricated.

This application is a division of my co-pending application Serial No. 563,407 entitled "Lubricating devices", filed September 17, 1931 and patented August 6, 1935, as No. 2,010,140.

One of the objects of the invention is to provide a coupler capable of being securely attached under force of lubricant pressure to a fitting to be lubricated.

Another object is to provide a coupler as described wherein the operator may manually thrust the discharge plunger of the coupler into sealing engagement with a fitting to be lubricated and thereafter admit lubricant thereto for discharge into the fitting and for simultaneous operation of the lubricant pressure operated clamping mechanism of the coupler.

Other objects will be apparent after reading the following specification and claims, and after consideration of the drawing forming a part of the specification wherein:

Figure 2:
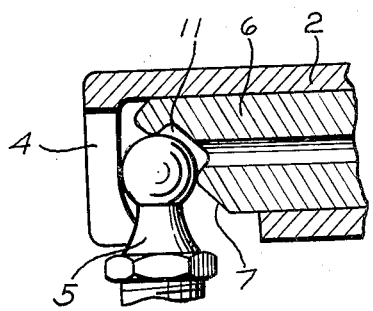
Fig. 2 is a fragmentary sectional view of the discharge plunger of the coupler of Fig. 1.
Figure 3:
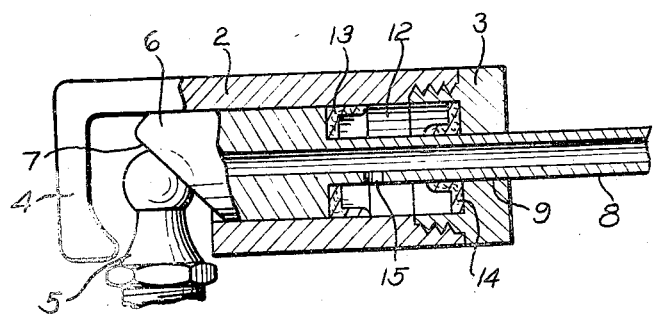
Fig. 3 is a view similar to Fig. 1 illustrating the coupler as it appears during initial engagement with a fitting.

With reference to the drawing the coupler may comprise a cylindrical casing 2 closed at its rearward end by a threaded plug 3 as shown. A fitting engaging claw 4 may be formed on the forward end of the casing and arranged to overhang the bore thereof. The claw 4 is so formed as to provide an abutment against which the ball head of a ball-headed lubricant receiving fitting 5 may rest as indicated in Fig. 2.

A tubular plunger 6 having its forward end 7 inclined relative to the longitudinal axis thereof is slidably mounted within the casing 2 and formed at its rearward end with an integral and coaxial conduit 8 extending through a central bore 9 in the plug 3. A pocket 11 having a circular periphery may be formed in the inclined surface of the forward end 7 of the plunger so proportioned and arranged as to receive a zone of the ball-shaped head of the fitting 5 when the plunger is pressed thereagainst, said zone extending throughout substantially one-half of the surface of the head. A sealing contact between plunger and fitting may therefore take place when the plunger is urged against the surface of the fitting head as by the application of manual thrust to the plunger in the direction of the fitting head through the medium of the conduit 8.

A lubricant pressure chamber 12 is provided within the casing 2 rearwardly of the plunger 6 one end of which is represented by the inner end of the plunger. Annular washers 13 and 14 surrounding the conduit may be employed as shown to seal the chamber thus to render the chamber lubricant-tight. An opening 15 through the side wall of the conduit 8 in that portion located within the chamber 12 serves to supply lubricant under pressure to the chamber from the conduit when the conduit 8 of the coupler is connected to a source of lubricant supply and a flow of lubricant under pressure thereto effected.

In operation, initial sealing engagement between the discharge plunger 6 of the coupler and a fitting to be lubricated may be carried out by the application of manual thrust upon the conduit 8 in the direction of the fitting thereby to press the face of the plunger tightly against the surface of the fitting, the casing 2 having been previously pushed forwardly relative to the plunger to open the space between the claw 4 and plunger 6 for admission of the fitting head.

Figure 1:
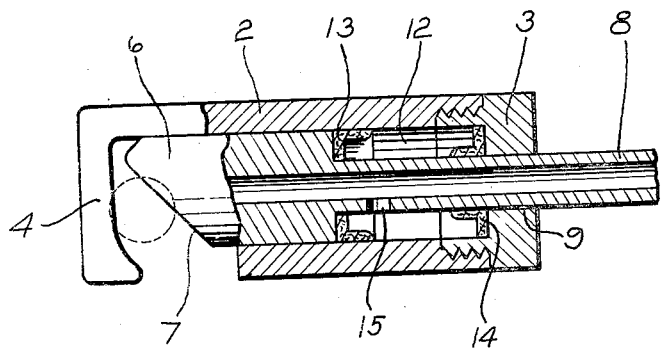
Fig. 1 is a view partially in section of a lubricant pressure operated clamp coupler constructed in accordance with the invention.

The operator may next admit lubricant under pressure to the conduit 8 from a suitable source of supply whereupon lubricant will be urged through the plunger and into the fitting, as well as into the chamber 12 through the conduit opening 15. Admission of lubricant under pressure to the chamber 12 will tend to expand the chamber thus causing the plunger 6 and claw 4 to move relatively to one another to clamp the fitting head securely therebetween as shown in Figs. 1 and 2.

While I have shown the claw 4 as of conventional design for purposes of simplicity, the claw or clamping element of the coupler, if desired, may be formed in accordance with the structure illustrated and described in my said copending application Serial No. 563,407. It is also to be understood that the herein described embodiment of the invention is for the purpose of illustration only, and various changes may be made therein without departing from the spirit and scope of the invention.

I claim:

1. A lubricant discharge nozzle comprising a relatively stationary conduit having a diametrically large portion formed with a discharge orifice at one end thereof and adapted for connection with a source of lubricant supply under pressure at its opposite end, a casing slidably mounted upon the normal and enlarged portions of said conduit and formed with a clamping member at its forward end in cooperative relationship with the discharge orifice in the enlarged portion of the conduit, packing means between the conduit portions and the casing to render the space within the casing surrounding the conduit lubricant-tight, and means for admitting lubricant under pressure in said conduit into said space within the casing surrounding said conduit whereby said lubricant pressure will cause relative movement between the conduit and casing to clamp the nozzle upon a fitting.

2. A lubricant discharge nozzle comprising a substantially rigid conduit member having a discharge orifice, a clamping member slidably embracing said conduit member and adapted to clamp a lubrication nipple to said discharge orifice, and means disposed exteriorly of said conduit member and responsive to lubricant pressure in said conduit member for causing rearward movement of said clamping member on said conduit member.

3. A lubricant discharge nozzle comprising a substantially rigid conduit member having a discharge orifice at one end adapted to engage with a lubrication nipple or fitting, a tubular member slidably disposed on said conduit member and formed at one end to provide a clamping member in registration with said discharge orifice, said conduit member and said tubular member being formed to provide a chamber surrounding the conduit member and communicating with the interior thereof, and means within said chamber responsive to lubricant pressure in said conduit member to cause rearward movement of said clamping member on said conduit member.

4. A lubricant discharge coupler comprising a substantially rigid conduit having a discharge orifice in its forward end, a clamping member slidably mounted upon said conduit and adapted to cooperate with the discharge end of said conduit to clamp a lubricant receiving fitting therebetween upon relative movement between the conduit and the clamping member, and means associated with the clamping member and with the conduit providing a cylinder and a piston for said cylinder, said means being so constructed and arranged as to cause relative clamping movement between the conduit and the clamping member when lubricant under pressure is admitted to said cylinder, said conduit extending through said cylinder and having its rearward end exposed for manual manipulation whereby manual thrust applied to said conduit in the direction of said fitting may effect initial sealing engagement between conduit and fitting, said conduit having a passageway through its side wall for conducting lubricant admitted to the conduit into said cylinder.

JOHN L. CREVELING.